Aug. 9, 1966     J. W. BERGSTROM ETAL     3,265,899
SEMICONDUCTOR AMPLIFYING RADIATION DETECTOR
Filed July 25, 1962

INVENTORS
James W. Bergstrom &
BY Robert R. Bockemuehl

Robert E. Fowler
ATTORNEY

United States Patent Office 3,265,899
Patented August 9, 1966

3,265,899
SEMICONDUCTOR AMPLIFYING RADIATION DETECTOR
James W. Bergstrom, Troy, and Robert R. Bockemuehl, Birmingham, Mich., assignors to General Motors Corporation, Detroit, Mich., a corporation of Delaware
Filed July 25, 1962, Ser. No. 212,253
2 Claims. (Cl. 250—211)

This invention relates to radiant energy or radiation detection means.

At present, there are mainly two general types of radiation detectors or devices for measuring incident radiations from various sources. The first type consists of photoconductor devices in which the electrical resistivity of some material is directly changed by incident radiation falling thereon. In this type, the detector is usually connected in series relation in an electrical circuit and, thus, directly changes the total current flowing through the circuit as the amount of radiation falling thereon varies. The second type may be called the reverse bias diode type. In this type, a field is set up adjacent the P-N barrier in the semiconductor body due to the application of voltage to the body. This field is affected by incident radiation and this in turn varies the current flow through the barrier.

The first type is a high current, slow response time device and, therefore, is used only in low frequency applications. The second type is a low current fast time response device which can be used for high frequency applications but is not capable of carrying large current. It also has the added limitation that the area sensitive to radiation is very small since it is only that area immediately adjacent the P-N barrier.

It is the object in making the present invention to provide a radiation detector means which is capable of controlling sizable currents and has a short time of response.

It is a further object in making this invention to provide radiation detection means having a short time of response for operating at high frequencies.

It is a still further object in making this invention to provide radiation detection means capable of controlling a sizable current.

With these and other objects in mind, our invention will be more clearly understood by reference to the following specification and to the drawings in which.

Figure 1:
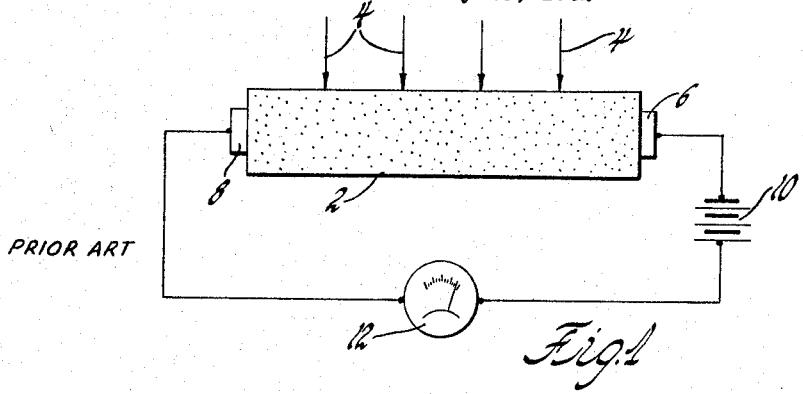
FIGURE 1 is a diagrammatic sketch of a radiation sensitive system of the prior art of the first type mentioned.

Referring now more particularly to FIG. 1, there is shown therein a body 2 of a material whose electrical conductivity changes upon the reception of incident radiation. For example, presuming that the radiation under consideration is light, in the dark the body 2 would have a certain electrical resistance but when light rays fall on the body, as indicated by the arrows 4, the resistance of the body 2 changes in proportion to the amount of the incident radiation. The body may be provided with connecting electrodes 6 and 8. A source of electrical power 10 in series circuit with some indicating means, such as a current meter 12, are connected across the two contacts 6 and 8. If now this assembly is placed in an area in which there is no radiation of the type to be measured, the needle on the meter would read zero. By then admitting some radiation, such as light, to one surface, the resistance of the body 2 changes, the total current flowing in the series circuit changes and the meter 12 would indicate such a change. This meter may be calibrated in terms of amount of incident energy.

The second type of known radiation detector is that referred to as the reverse bias diode type. In this type, shown in FIG. 2, a semiconductor body 12 has areas of different type conductivity, such as section 14 which may be P-type conductivity and section 16 having N-type conductivity. These are separated by a rectifying barrier 18. This construction forms a diode and the current will pass in one direction through the body more easily than in the other to provide rectification. This diode may be connected in a similar type of circuit as that of the radiation detector shown in FIG. 1. Thus, on the two opposing ends of the body 12 there are provided ohmic contacts 20 and 22. In series relation, there are connected a source of power, such as battery 24, and some indicating means for current, such as meter 26. With voltage applied across contacts 20-22, a certain amount of current flows through the system and with the proper reverse bias, a magnetic field 28 is created around the rectifying barrier 18. It is known that this field is sensitive to incident radiation, as shown by the arrows 30. If the system is, therefore, balanced in an area where no incident radiation is present, and the meter 26 adjusted to a neutral position, then when radiation is applied at the field indicated by 30, it will vary the field effecting a change in the total series current which the meter 26 will indicate.

Figure 2:
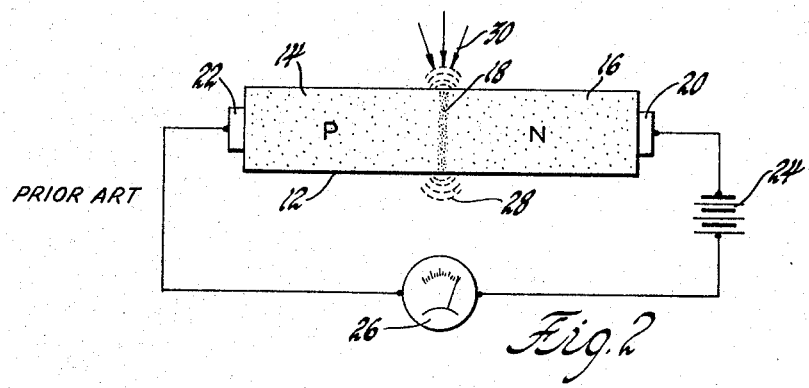
FIG. 2 is a diagrammatic sketch of a radiation sensitive system of the second type discussed.

As mentioned earlier in the specification, both of these known forms have disadvantages. The form shown in FIG. 1 has the disadvantage that it has a relatively slow response time since electrons relayed by the arrival of incident energy make several passes through the system before they recombine, and, therefore, these devices are not satisfactory for high frequency use. In the second form, as shown in FIG. 2, while the response time is short and this type is adaptable for high frequency operation, the current flow is relatively small since it is the reversed bias current which is being controlled. This type also has the added disadvantage that the sensitive area, i.e. that immediately adjacent the P-N barrier, is very small.

Figure 3:
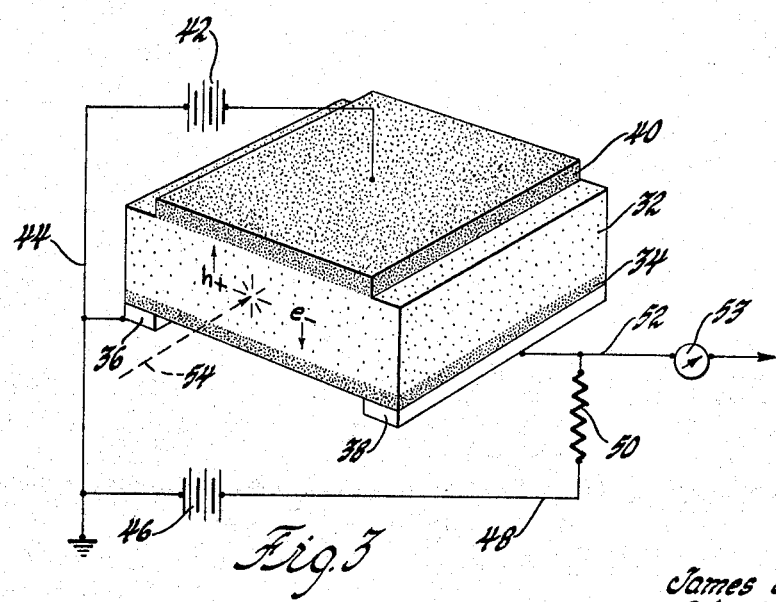
FIG. 3 is a perspective view of a radiation sensitive device embodying our invention and provided with suitable biasing voltages.

It is, therefore, desired to provide a radiation detector which is easily fabricated, has fast response, can carry relatively large amounts of current and has a fairly large sensitive area. In FIG. 3 there is shown one embodiment of our invention having these characteristics. This is illustrative only and there are other forms which fall within the scope of our invention. Referring particularly to FIG. 3, there is shown therein a crystal 32 of intrinsic semiconductor material such, for example, as cadmium sulphide or cadmium selenide monocrystalline in form. One face of the crystal has a thin diffused area 34 into which a desired impurity has been diffused to convert this area into a conductive layer. This layer might be, for example, indium diffused to convert it into an N+ type. A pair of spaced ohmic electrodes 36 and 38 are secured to this face on opposite sides to act merely as electrical contacts. Current may, therefore, be introduced into one side of this layer, flow through the same, and out through the other side contact.

On the opposite face of the semiconductor body 32, there is provided a blocking or gate contact 40 for controlling purposes. This gate contact may be produced, for example, by the diffusion of some impurity into the crystal. For example, a thin film of copper may be evaporated or plated on this side and then the temperature raised to a sufficient point to diffuse the copper into the crystal. The copper diffused area 40 acts as a control or blocking electrode. A source of power illustrated by battery 42 has one terminal connected to the upper surface of blocking contact 40 and the other terminal connected to ground and contact 36 through line 44. In a similar manner, a second source of electrical power 46 has one terminal connected to the ground line 44 and the other connected through line 48 and limiting resistance 50 to conductor 52 extending from ohmic contact 38 to any desired indicating means 53. With this construction, a steady current will flow through conductive layer 34 due to the application of voltage thereacross in the absence of incident radiation.

The radiation sensitive area in this instance is the main intrinsic portion 32 of the crystal and the arrival of incident radiation of the type to be measured at some point on that surface will modify or vary this normal steady current. At the same time, power supply 42 is applying a potential difference across this area between gate 40 and conductive layer 34. The operation of the device as a radiation detector is as follows:

When a radiation particle following the incidence line 54 impinges upon the surface of the intrinsic crystal 32 and is absorbed therein, one or more electron-hole pairs (e−, h+) are produced. The electrons whose mobility is greater than that of the holes, due to the field provided by power supply 42 move rapidly toward the conductive layer 34 while the holes move more slowly toward the blocking gate contact 40. Because the electrons are removed from this central area 32 before the positive holes, a positive charge is produced in the previously neutral region. This inequality in mobility between the electrons and holes produces a transient condition during this period and a large increase in the number of electrons adajcent to layer 34 to produce a current pulse. This current pulse produces a voltage pulse which indicates this incident radiation arrival. This pulse may be coupled into any amplifying, modifying or indicating circuit desired through the line indicated by the arrow. The upper frequency limit of operation is determined by the period of the transient condition, i.e. how long it takes the electron-hole pairs to be absorbed. This is limited by (1) the time required for removal of the generated holes as determined by the strength of the electric field and the hole mobility, and (2) the charge transfer RC constant. The thickness of the intrinsic region 32 affects this. Increasing the thickness of this region increases the upper frequency limit since it reduces the capacity of the device between areas 40 and 34.

The optimum direction of radiation depends on the charactor of radiation being measured. The maximum signal occurs when the radiation is absorbed in that portion of the intrinsic region nearest the conduction layer 34. Therefore, low penetrating radiation would give the largest signal and be most effective when it was absorbed in the intrinsic region 32 near surface 34 while deep penetrating radiation would be most effective when absorbed on the surface of the crystal nearer the blocking or control electrode 40.

This construction provides a high freqeuncy response device which is capable of indicating the arrival of a single beta particle. It also is capable of controlling or providing a substantial amount of current and has a reasonable amount of sensitive surface.

What is claimed is:

1. In radiation sensitive means, a body of intrinsic semiconductor means of low conductivity and in which the drift mobility of electrons and holes varies widely and one greatly exceeds the other, said body having opposed flat surfaces, a first diffused impurity area on one of the flat surfaces providing a thin layer of high electrical conductivity, a second diffused impurity area on the opposite face of the semiconductive means forming a rectifying contact with said opposite face and acting as a gating electrode, a plurality of spaced ohmic contacts applied to the first diffused area so that the thin layer of high electrical conductivity may be connected into an electric circuit and have current flow therethrough, a first source of electrical power connected across the first and second diffused areas to develop a field across the two, a second source of electrical power connected across the ohmic contacts to produce current flow through said thin layer so that incident radiation on the edges of said semiconductive body between the first and second diffused areas will produce a pulse in the current flowing through the thin layer due to the wide differential in drift mobility of electrons and holes and indicate the presence of radiation.

2. In radiation sensitive means, a body of intrinsic semiconductor material normally having a low electrical conductance and in which the drift mobility of electrons and holes varies widely and one greatly exceeds the other, a first flat surface of said body being treated to provide a thin layer of one conductivity type, spaced ohmic contact areas secured to said first surface to act as input and output electrodes, an area of opposite conductivity diffused into the second flat opposed face of the body to act as a blocking electrode, and two electrical biasing means connected, respectively, across the ohmic contacts and one of the ohmic contacts and the blocking electrode to produce voltage differences thereacross so that when radiation falls on the intrinsic portion of the body free electrons and holes will be liberated and the difference in the length of time it takes the electrons to reach the thin layer of one conductivity type from that time required by the holes to reach the blocking elecrode will produce a signal indicative of the receipt of radiation.

References Cited by the Examiner

UNITED STATES PATENTS

| | | | |
|---|---|---|---|
| 2,744,970 | 5/1956 | Shockley | 250—211 X |
| 2,794,917 | 6/1957 | Shockley | 250—211 |
| 2,812,446 | 11/1957 | Pearson | 250—211 |
| 2,962,595 | 11/1960 | Henisch | 250—211 |
| 2,962,605 | 11/1960 | Grosvalet | 250—211 X |
| 2,986,591 | 5/1961 | Swanson et al. | 250—211 |
| 2,993,998 | 7/1961 | Lehovec | 250—211 |
| 3,005,107 | 10/1961 | Weinstein | 250—211 |
| 3,018,426 | 1/1962 | Ruppel | 317—237 |
| 3,051,839 | 8/1962 | Carlson et al. | 250—211 |
| 3,051,840 | 8/1962 | Davis | 250—211 |
| 3,064,132 | 11/1962 | Strull | 250—211 |

RALPH G. NILSON, *Primary Examiner.*

ARCHIE R. BORCHELT, *Examiner.*

E. STRICKLAND, M. A. LEAVITT,
*Assistant Examiners.*

UNITED STATES PATENT OFFICE
CERTIFICATE OF CORRECTION

Patent No. 3,265,899                                  August 9, 1966

James W. Bergstrom et al.

It is hereby certified that error appears in the above numbered patent requiring correction and that the said Letters Patent should read as corrected below.

Column 4, lines 31 and 32, strike out "across the ohmic contacts and one of the ohmic contacts", and insert instead -- across the ohmic contacts and across one of the ohmic contacts --.

Signed and sealed this 1st day of August 1967.

(SEAL)
Attest:

EDWARD M. FLETCHER, JR.                   EDWARD J. BRENNER
Attesting Officer                                     Commissioner of Patents